Aug. 22, 1961 C. JOHNSON 2,997,065
SPOOL VALVE O-RING SEALED SPOOL
Original Filed May 11, 1955 6 Sheets-Sheet 1
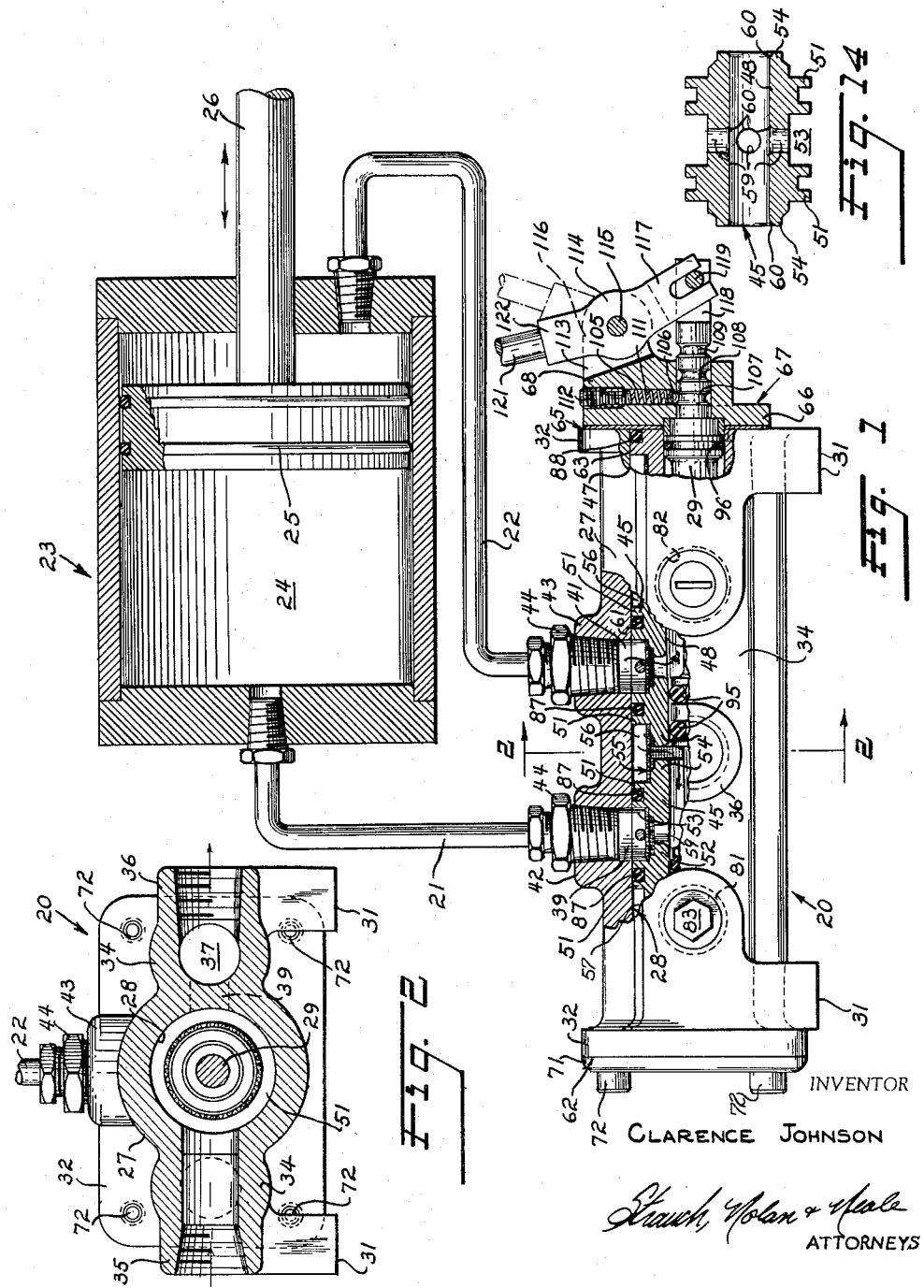
INVENTOR
CLARENCE JOHNSON
ATTORNEYS Aug. 22, 1961   C. JOHNSON   2,997,065
SPOOL VALVE O-RING SEALED SPOOL
Original Filed May 11, 1955   6 Sheets-Sheet 2
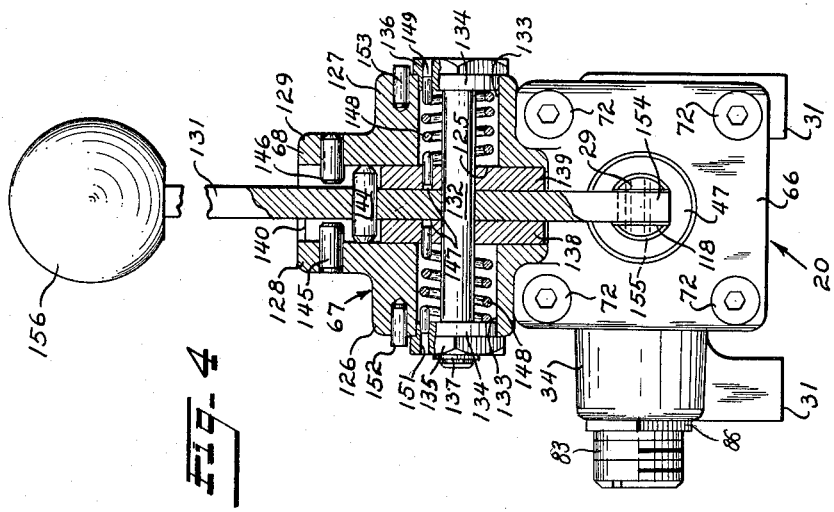
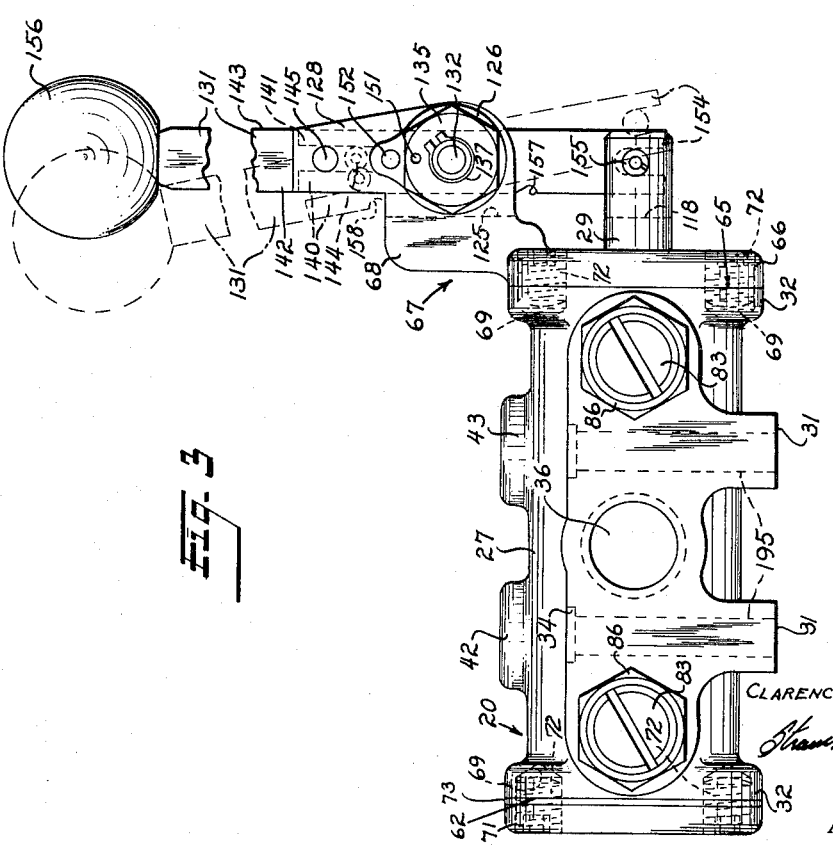
INVENTOR
CLARENCE JOHNSON
ATTORNEYS

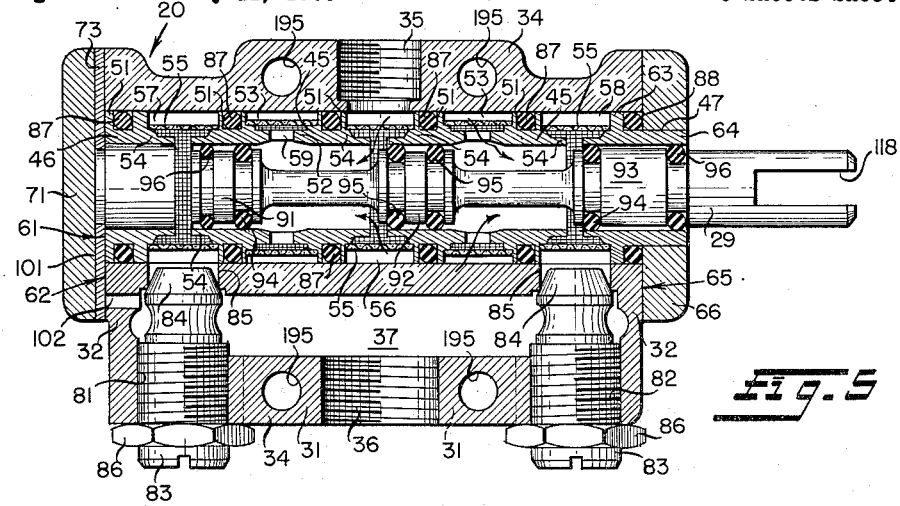
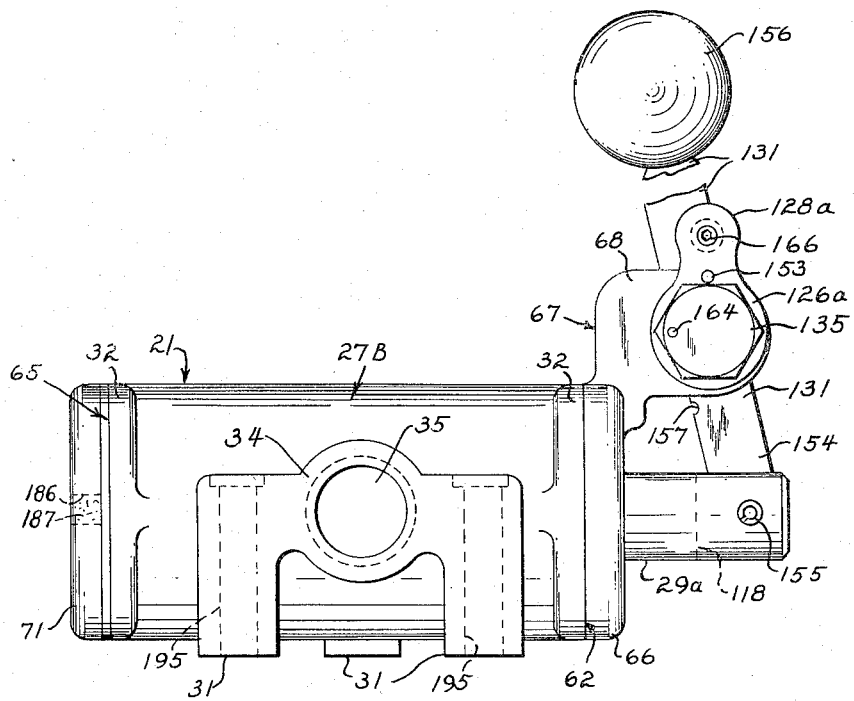

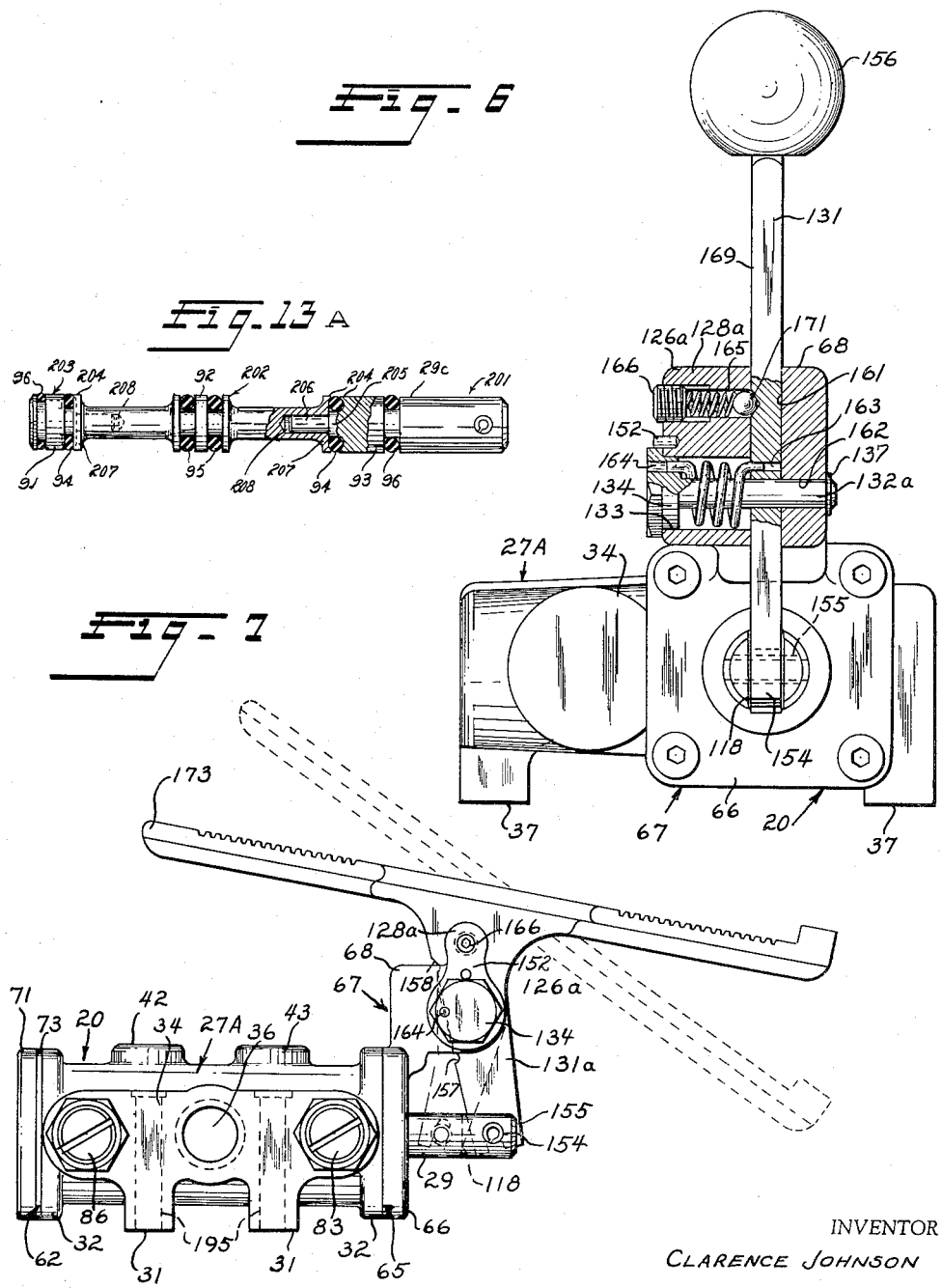

Aug. 22, 1961 C. JOHNSON 2,997,065
SPOOL VALVE O-RING SEALED SPOOL
Original Filed May 11, 1955 6 Sheets-Sheet 5
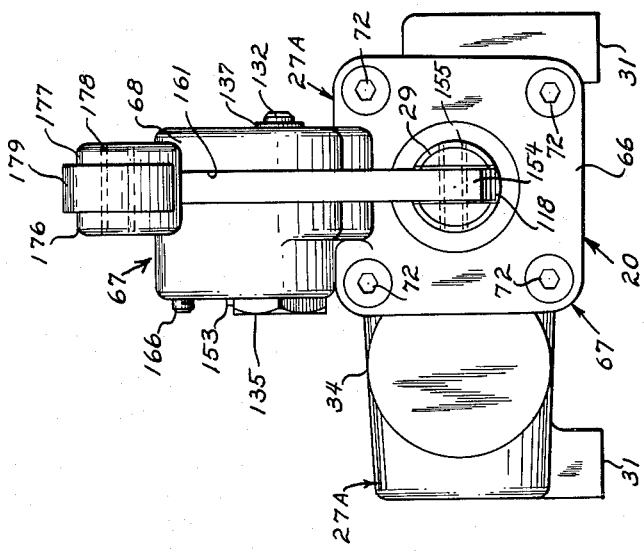
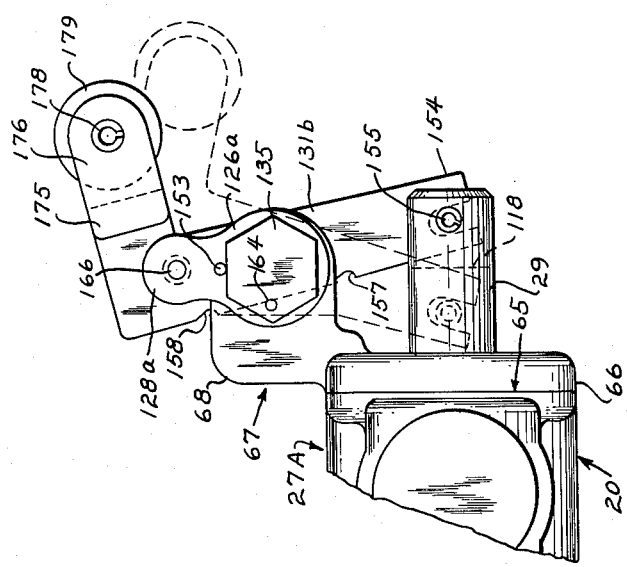
INVENTOR
CLARENCE JOHNSON
BY *Strauch, Nolan & Neale*
ATTORNEYS

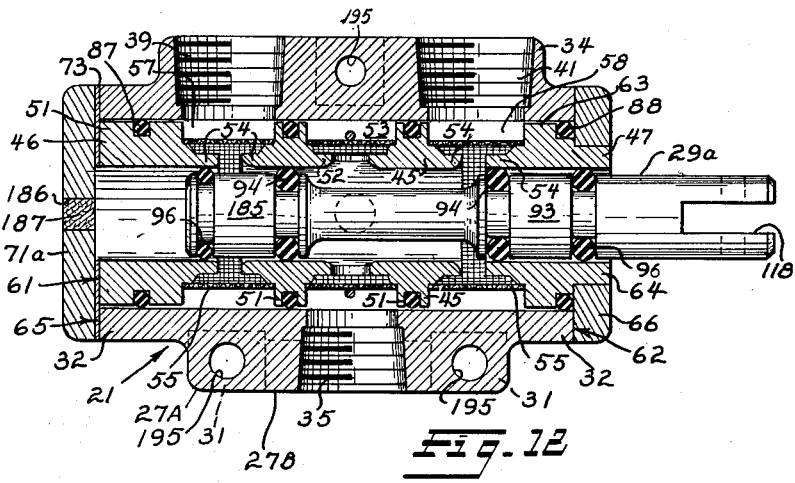
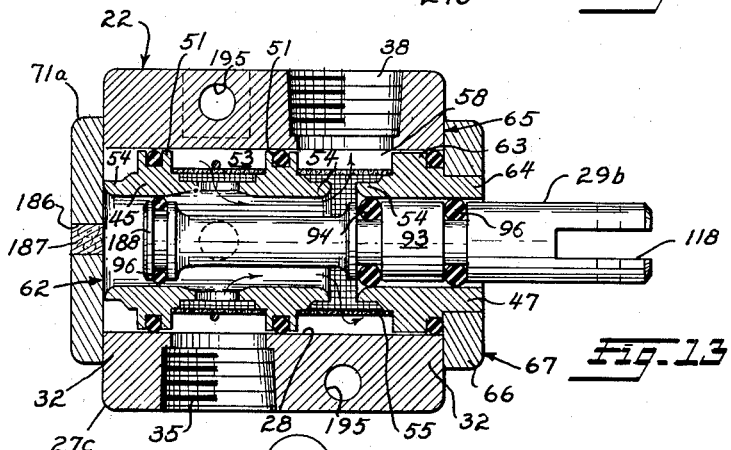
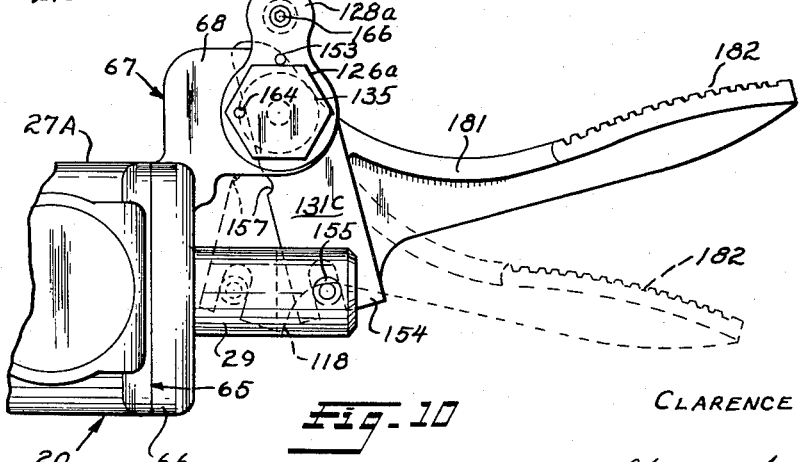

United States Patent Office 2,997,065
Patented Aug. 22, 1961

2,997,065
SPOOL VALVE O-RING SEALED SPOOL
Clarence Johnson, 1804 Green Road,
South Euclid 21, Ohio
Original application May 11, 1955, Ser. No. 507,533. Divided and this application Mar. 25, 1958, Ser. No. 731,563
10 Claims. (Cl. 137—622)

The present invention relates to control valves and more particularly to lever operated spool valves for controlling the supply of fluid to the servo-motors used in servo-motor powered production equipment. This application is a division of applicant's copending application Serial No. 507,533, filed May 11, 1955 as a continuation-in-part of copending application Serial No. 348,942 of Clarence Johnson entitled Valves filed April 15, 1953, now Patent No. 2,912,007.

While control valves designed for servo-motor control usage have heretofore been proposed, the prior control valves have been more or less special design or "tailor made" valves designed for a particular usage. As a consequence, the prior proposed valves have been relatively expensive and not suited for quantity production.

A primary object of this invention, therefore, resides in the production of spool control valves of various sizes having different passage arrangements from a minimum number of basic quantity production elements to provide valves suitable for specifically different control systems and a novel method of making such valves to minimize the inventory of parts to be stocked by the manufacturer.

Another object of the present invention is to provide a control valve of the character heretofore mentioned with a spool assembly that may be utilized to control the flow of either gaseous fluids or liquids therethrough.

Another object of this invention is to provide a control valve of the character heretofore mentioned with a simple and inexpensive spool assembly adapted for selective use on any one of several different types of valves.

Still another object of the present invention is to provide the spool element of a spool type control valve with sealing O-rings of resilient material having special characteristics to assure seals of maximum sealing efficiency at all points and a sufficiently high modulus of elasticity at points passing over the outlet ports where the ring acted on by the high pressure control fluid is subjected to an extremely lower pressure at the outlet ports conducive to permitting a blow out of the ring into the outlet port.

Still further objects of the present invention will appear from the following description and appended claims when read in conjunction with the accompanying drawings wherein:

FIGURE 1 is an elevational view of one embodiment of a four way valve embodying certain of the improvements of this invention shown installed in a diagrammatically illustrated servo-motor system and adapted for hand operation;

FIGURE 2 is a transverse sectional view through the valve of FIGURE 1 taken substantially on line 2—2 of FIGURE 1 when viewed in the direction of the arrows;

FIGURE 3 is an elevational view of a preferred form of four way valve similar to but longitudinally shorter than the valve of FIGURE 1 illustrating a specifically different and preferred form of hand actuated operating assembly;

FIGURE 4 is an end view of the valve of FIGURE 3 viewed from the right end, certain portions of the hand actuated operating assembly being shown in section;

FIGURE 5 is a longitudinal sectional view taken on line 5—5 of FIGURE 3 showing the details of the four way valve of FIGURE 3;

FIGURE 6 is a view similar to FIGURE 4 illustrating a modified form of hand actuated operating assembly applied to a four way valve of larger fluid capacity than that shown in FIGURES 3 and 4;

FIGURE 7 is a side view on a smaller scale of the four way valve of FIGURE 3 equipped with a foot treadle operator in place of the hand lever of FIGURE 3;

FIGURE 8 is a fragmental side view of a four way valve like that of FIGURE 6 equipped with a cam operator in place of the hand lever of FIGURE 6;

FIGURE 9 is an end view of the valve and operator of FIGURE 8 viewed from the right hand end of FIGURE 8;

FIGURE 10 is a fragmental side view similar to FIGURE 8 illustrating the valve of FIGURE 8 equipped with a foot pedal operator;

FIGURE 11 is a side view of a three way valve made in accordance with this invention viewed from the inlet side or side opposite that of the previous figures showing a hand operator like that of FIGURE 3 mounted on the opposite end of the valve;

FIGURE 12 is a longitudinal sectional view taken on line 12—12 of FIGURE 11 looking in the direction of the arrows and illustrating the details of the three way valve of FIGURE 11;

FIGURE 13 is a view similar to FIGURE 12 illustrating the details of a two way valve made in accordance with the present invention;

FIGURE 13A is an elevational view of a preferred spool construction with certain parts in section for clarity of illustration; and FIGURE 14 is a detailed sectional view through one of the intermediate lever elements provided by this invention.

With continued reference to the drawings wherein like reference numerals are used throughout to indicate the same parts and with particular reference for the moment to FIGURES 1 and 2, a four way valve 20 made in accordance with the present invention is illustrated connected through pipe lines 21 and 22 to a servo-motor 23. While control of servo-motor 23 as illustrated is one use for the valves of this invention, it will be appreciated that the valves may be connected to other servo-motor mechanisms or similar devices in various ways to accomplish desired control functions. As illustrated, servo-motor 23 comprises a cylinder 24 and a double acting piston 25 disposed therein for reciprocating movement. The piston rod 26 is connected in any conventional manner to a machine tool table, tool, cross slide or the like or any other device adapted to be moved at a controlled rate as will be clear to those skilled in the art.

While valve 20 may be actuated automatically or manually, the present invention contemplates a readily separable lever type operator of any one of several different types and a unique body and spool structure adapting such control valves for quantity production in spite of the customary special operating functions. To this end, valve 20 comprises a valve body or housing 27 of generally elongated form having a longitudinally extending bore or passage 28 adapted to receive separable liner sleeves for slidingly supporting a valve member in the form of a reciprocating spindle 29. While body or housing 27 may be supported in any suitable way, each of the illustrated embodiments embodies support feet 31 adapting the body for bolted attachment to a mounting plate or the like (not shown) in a manner well known to the art.

To effect manufacturing and inventory economies, the present invention proposes to eliminate as far as possible the need for different valve housings in the standard ¼", ⅜" and ½" three and four way valves and the need for careful machine fitting of the valve parts in all types and sizes of valves. To this end, the same housing 27 is employed in the four way valves of the ⅜" and ¼" sizes, (FIGURES 1–5 and 7), a similar housing 27A having a wider body (FIGURES 6, 8, 9, 10) is used in the four way valves of ½" size, a different housing 27B (FIGURES 11 and 12) is used for the three way ½" valves, a similar but narrower body (not shown) is used for the three way valves of the ⅜" and ¼" sizes, and a similar but shorter housing 27C (FIGURE 13) is used for the two way valves. The basic housings in all cases are produced in block form. All of the bodies are of generally elongated form and are preferably provided with end flanges or faces 32 of identical shape and size (FIGURES 3 through 13). The four way valve bodies in the ¼", ⅜" and ½" sizes are provided with a laterally offset, longitudinally directed, body formation 34 along one side to provide for the desired exhaust porting.

In all of the four way valves, the valve bore 28 and inlet port 35 longitudinally centered along the side opposite formation 34 are drilled and tapped to the desired size at the time an order for a particular size valve is received. Each of these bodies, has a cored exhaust port 36 tapped to size and arranged diametrically opposite the inlet port and a cored manifold passage 37 extending longitudinal of body formation 34 and terminating short of the body ends and intersecting the exhaust port 36 formed in the body formation 34. Bore 28 connects with the opposite ends of manifold passage 37 through drilled passages (FIGURES 2 and 5) formed as hereinafter pointed out. In the ½" four way valves, formation 34, due to the necessarily larger diameters of bore 28 and passage 37 required to handle the greater fluid flow, is substantially larger than in the ¼" and ⅜" bodies (see FIGURES 6 and 8 through 11).

In the three way valves, the formation 34 and manifold passage 37 are omitted and a pair of longitudinally spaced drilled and tapped outlet ports 38, symmetrically disposed at either side of the longitudinal center of the body, are provided (see FIGURE 12) at the same time that bore 28 is drilled. In the two way valves (FIGURE 13), the inlet port 35 and an outlet port 38, offset and located on opposite sides of the valve body, are drilled and tapped to the desired size at the same time that the bore 28 is drilled.

All of the four way valves are provided with longitudinally spaced pairs of drilled outlet ports 39 and 41 (FIGURE 1) formed in longitudinally spaced bosses 42 and 43 (FIGURES 1, 2, 3 and 7). Bore 28 and the various ports 35, 36, 38, 39 and 41 are all suitably drilled and tapped to size on order so that a manufacturer can make up his anticipated requirements of basic valve bodies of each style, namely, two way, ¼" and ⅜" four way, ¼", ⅜" three way, ½" three way and ½" four way.

Drilled bore 28 extending from end to end of the body provides a surface finish satisfactory for receipt of suitably formed intermediate liner elements 45 (FIGURE 14) and desired mating end liner elements 46 and 47 (FIGURE 5). These liners are axially arranged in the desired order in bore 28 to form a longitudinally discontinuous guide bore 48 for the desired valve spindle 29. To eliminate the need for a careful machined fit between bore 28 and the liners, the present invention contemplates that the liners be formed with one or more annularly enlarged ribs 51 each containing a ring groove and being of a diameter sufficiently less than that of bore 28 to assure a free sliding cooperation with bore 28 or even a slight clearance as illustrated in FIGURES 5, 12 and 13. As clearly seen in FIGURE 14, liners 45 are each provided with a pair of such grooved ribs 51 respectively disposed symmetrically on either side of a transverse plane passing through the longitudinal center of the liners. These paired ribs together with the annular wall 52 of reduced diameter therebetween define an annular recess 53 the purpose of which will be hereinafter pointed out.

The opposite ends of each liner 45 are identically formed to provide end extensions 54 of the same axial dimensions and identical configuration. These extensions 54 are adapted, when a pair of liners 45 are assembled in bore 28 with suitable spacer screens 55 therebetween, to define annular recesses 56 similar in length and depth to recesses 53 provided between pairs of ribs 51. Similar end extensions 54 are formed on the inner ends of end liners 46 and 47 to cooperate with the end extension of an adjacent liner 45 to form respective annular recesses 57 and 58 when similar screens 55 are disposed between the liners 45 and 46 and 45 and 47 as more clearly disclosed in FIGURES 5, 12, and 13. The extensions 54, as more clearly shown in FIGURE 14, are formed with a radii 60 at the intersection of the end faces and the guide bore 48. Each liner 45 in longitudinally centered relation with respect to recess 53 is provided with a series of radial bores 59 the inner ends of which, at their intersection with bore 48 are also formed on a radii 60. The purpose of these radii will be hereinafter pointed out.

As clearly seen from FIGURES 5 and 12, end liners 46 are formed with a single annular grooved rib 51 and a transversely disposed end face 61. When properly positioned in bore 48 with the required liners 45 and 47, end face 61 will be in the plane of the end face 62 of body member 27. By reference to FIGURES 5, 12 and 13, it will be seen that liners 47 are also provided with a single ungrooved, annular rib 63 at the inner end of extension 54 and that the axial length thereof terminates short of body face 65 to provide terminal extension 64 of reduced diameter adapted to protrude through and beyond the end face 65 of housings 27 to 27C as in FIGURES 1, 5, 12 and 13. These protrusions receive and center the mounting plate 66 of an operating lever support bracket 67 and form therewith an annular ring groove the purpose of which will presently appear. Bracket 67 may take the form of that illustrated in FIGURE 1 but preferably is formed as illustrated in FIGURES 3 and 4 or FIGURES 6, 7, 8, 9, 10 and 11 in which the base plate, midway between a pair of opposed side edges and at a third side edge, is provided with an axially and radially extending overhanging support arm 68 of substantial lateral thickness.

To secure maximum utility out of the preferred form of bracket 67, the opposite end faces 62 and 65 of body member 27 are provided with equiangularly spaced, drilled and tapped screw openings 69, FIGURE 3, adapted to cooperate with similarly spaced tapped openings in base plate 66. As a consequence, bracket arm 68 may be located at either end (compare FIGURES 11 and 12 to the remaining figures) and in any one of a plurality of angular positions with respect to the body 27 so as to dispose the selected operating lever in the most desirable position for operation. The end of each body member opposite that provided with bracket 67 is closed by a closure plate 71 secured thereto by suitable screws 72.

While cover plate 71 may directly engage the end 62 of body 27, it is preferred in the three and four way valve of FIGURES 3 through 12 that a sealing gasket 73 be interposed between the cover plate and the end of the body. It will be appreciated that the tapped openings 69 in end 62 of body member 27 are angularly disposed in exactly the same relation as the openings 69 of end face 65 so that the operating lever bracket member 67 may be selectively applied to either end of the body.

Referring for the moment to FIGURES 3 to 11 on the one hand and FIGURES 12 and 13 on the other, it is to be noted that the shape and size of the body end faces in all forms of bodies are of uniform shape and dimension. This is true irrespective of the rated size of the valve so that brackets 67 and cover plates 72 will be interchangeable in all forms and sizes of valves. As a result of this interchangeability, it will be appreciated that a manufacturer, dealer or distributor of the valves will not be required to stock varying sizes of cover members and bracket members for the various sizes and port arrangements of the standard lines of valves.

Further manufacturing economies are effected through this invention, since the four way valve bodies 27 for the ⅜″ and ¼″ rated valve sizes can be identical to start with irrespective of the size of valve desired since the only differences will be in the drilling of the ports now to be described. Referring first to the valves shown in FIGURES 1 through 5 and FIGURE 7 there is disclosed a four way valve of ⅜ inch size. As clearly appears from FIGURES 1, 3, 5 and 7 such a four way valve on opposite sides of the longitudinally centered exhaust opening 36 are provided with tapped bores 81 and 82 closed by metering plugs 83 having tapered valve tips 84 cooperating respectively with manifold passages 85, drilled and counterbored in suitable fashion by a tool extending through openings 81 and 82 to form valve seats cooperating with their respective metering plugs 83. Each of the plugs 83 is suitably locked in adjusted position by means of lock nuts 86 in a manner well known to the art. By suitable adjustment of these metering plugs 83 the flow of fluid through manifold passages 85 can be regulated to secure any desired rate of flow into manifold passage 37 and out through the exhaust port 36. It will be appreciated, therefore, that the four way valves of this invention are designed to control fluid flow to regulate the rate of back and forth movement of the piston 25 of the servo-motor 23 or other device desired to be controlled.

It will further be appreciated that passages 81 and 82 can be merely plugged in which event the four way valve can be used to merely vent the opposite sides of the servo-motor piston 25 to the exhaust port 36 without any flow restriction.

In order to provide the desired flow paths through the valves each of ring grooves 51 of the various liner elements 45, 46 and 47 is provided with O-rings 87 formed of any suitable resilient material of suitable hardness adapted to support the liners 45, 46 and 47 in bore 28 and seal the annular receses 53 respectively from the recesses 56 and 57 and 58. These O-rings should preferably be of a durometer hardness of from 60 to about 80 to assure maintenance of a free floating relationship of the liner elements 45, 46 and 47 in bore 28 while providing adequate sealing properties. As a result of this O-ring structure, the various annular recesses 53, 56, 57 and 58 are respectively adapted to form annular passages connecting the interior bore 48 of the liner elements with one or the other of ports 35, 39, 41 or 85. Liner bore 48 receives the valve spool 29 and cooperates therewith to provide multiple passageways for conveying fluid from inlet 35 to one or the other of outlets 39, 41 while alternately venting ports 41 and 39 to the exhaust port 36 through manifold 37. In order to seal the end of liner element 47 against fluid escaping through the mounting plate 66, the groove formed between annular rib 63 and the inner face of mounting plate 66 is provided with an O-ring 86 of 60 to about 80 durometer hardness which seals bore 28 and liner element 47 and is held in place by mounting plate 66.

Proper passage of fluid in bore 48 is assured by providing valve spool 29 with axially spaced valving lands 91, 92 and 93 flanked on either side by ring grooves adapted to respectively receive O-rings for slidingly supporting spindle 29 in bore 48 formed by the liner elements 45, 46 and 47. The grooves at the inner end of land 91 and the inner end of land 93 are preferably provided with O-rings 94 of 90 Durometer hardness designed as hereinafter pointed out to resist the tendency of these rings to blow out through the exhaust ports in high presusre usage. The grooves at the outer ends of lands 91 and 93 are provided with O-rings 96 of 80 Durometer hardness having a squeeze fit with bore 48 and a diameter to substantially fill their respective grooves so as to form a firm support for spindle 29. The O-rings 94 and O-rings 95 of 80 Durometer hardness in the other grooves are free floating in their respective grooves and have an outer diameter only slightly greater (preferably by 5% to 8%) than the diameter of the guide bore 48. The width and depth of the receiving grooves for rings 94 and 95 is approximately 10% greater than the cross-sectional diameter of the O-rings to assure a good sealing contact. As a result, actual sealing between the bore 48 of the liners and the spool 29 between the exhaust ports and the high pressure passages is effected by the O-rings 94 while O-rings 96 support the spool in its sliding movement and are primarily relied upon to seal the spindle ends against escape of leakage fluid or low pressure exhaust fluid only. In practice it has been found that a squeeze of .005 inch is satisfactory for most applications of O-rings 96 but a somewhat tighter or looser fit may be used.

Referring again to rings 94 and particularly to the left end of the spool in FIGURE 5, it will be appreciated that the ring 94 of land 91 will pass across the annular recess 57 as the spool moves to its extreme left hand position. As this ring 94 reaches the right hand edge of recess 57, it will be subjected to high pressure over its right hand face and to atmospheric pressure over its left hand face. The resulting high pressure acting between the bottom of the ring groove and the inner peripheral face of the ring 94 effectively tends to force the O-ring radially and axially outward around the end of liner member 45. If the differential pressure is high and special precautions are not taken the ring will distend and extrude through the opening into recess 57 as the restraining influence of the guide bore is progressively relieved due to passage of the spool across the recess opening. Under such conditions and if such distention is of appreciable magnitude, the O-ring is liable to be "blown out" of the groove entirely or be sheared off by the land when it crosses the radius at the opposite side of recess 57. In order to prevent such an occurrence without resort to relocation of the O-rings in the guide bore effecting a seal on the spool solely due to the inherent contracting force of the O-ring itself or O-rings having an excessive hardness, which would, therefore, wear faster, a special O-ring configuration has been devised in which the ratio of the outer diameter to the cross-sectional diameter is approximately 4 to 1. With such proportions and the usual manufacturing tolerances, it is possible to use O-rings of material having a Durometer hardness factor as low as 65, taking advantage of the better wearing qualities thereof without the risk of blowing out or severing the O-rings and at the same time providing a more effective seal, particularly when operating fluids of higher pressures are to be used.

Referring for the moment particularly to the spool position of FIGURES 1 and 5, high pressure fluid entering the inlet port 35 will pass into annular recess 56, through the screen in the bottom of recess 56 and into the interior of bore 48 to the left of the pair of rings 95 adjacent land 92, then along bore 48 in the space surrounding the reduced diameter stem of the spindle 29, then outwardly through the liner passages 59 into the left hand annular passage 53 to the right of land 91 and through outlet port 39 leading to the left hand end of the servo-motor cylinder 34 as seen in FIGURE 1. It will, therefore, be appreciated that the high pressure fluid is confined to the passages lying between the lands 91 and 92 and acts to force the respective O-rings 94 and 95 toward their respective lands 91 and 92. The pressure fluid, therefore, finds its way into the ring grooves on the high pressure side and bottom of the O-rings 94 and 95 so as to force the O-rings laterally against the opposite side of their grooves and radially outwardly against the guide bore 48. Thus an effective seal is achieved between the annular contact surfaces of the guide bore and the low pressure side of the groove in each case with the result that a more effective seal will be provided as the fluid pressure increases. At this same time the recess 53 communicating with port 41 is vented to the exhaust port 36 through the portion of bore 48 surrounding the reduced diameter portion of the spindle located between lands 92 and 93 and their adjacent O-rings 95 and 94 and through the metering orifice formed by right hand passage 85 and its conical metering valve 84 leading to the manifold passage 37 and thence to the exhaust port 36.

Assuming now that spool 29 is to be moved to its next operating position the desired movement would be effected by moving the spool to the left as seen in FIGURES 1 and 5. The next position would be that in which the respective lands 91, 92 and 93 overlie the open bottom walls of annular passages 56, 57 and 58 respectively to cut-off all flow through the valve. In this new position, the O-ring 94 adjacent land 91 will be disposed in sealing engagement with bore 48 within the outer end extension 54 of the left hand liner member 45, the respective O-rings 95 on the opposite sides of land 92 will be disposed to contact the adjacent inner end extensions 54 of the two liner elements 45 and the O-ring 94 adjacent land 93 will sealingly engage the bore 48 within the outer end extension 54 of the right hand liner element 45. It will be appreciated, therefore, that in this position of the spool 29 the sealing rings 95 will be disposed to cut off flow from the high pressure inlet passage 56 to either of the adjacent annular passages 53 and pressure resistive rings 94 will be positioned to trap high pressure fluid in the passages leading to the opposite sides of piston 25 and prevent its escape to the low pressure exhaust porting. Thus flow of the trapped high pressure fluid is effectively prevented from the passages 53 to their respective exhaust passages 57 and 58. As a consequence a highly effective valve shut-off position is provided by the valve of this invention.

The next operating position of the spool would be that placing the inlet passage 35 in communication with the right hand passage 53 leading to the opposite side of the servo-motor piston 25 through the port 41 and pipe 22. This position is reached by moving the spool 29 further to the left as viewed in FIGURES 1 and 5 to a position where the land 91 and its associated O-ring 94 lie wholly within the portion of bore 48 formed by the inner end of liner element 46, the land 92 and its associated O-rings 95 lie wholly within the left hand liner element 45 and the land 93 and its associated O-ring 94 lie within the right hand end of the right hand liner element 45. In this position of the spool, fluid entering port 35 will pass from inlet passage 35 to the right of the right hand O-ring 95 adjacent land 92, axially along the portion of the port bore 48 surrounding the reduced spool section lying between lands 92 and 93, into the right hand passage 53 and thence through port 41 and pipe 22 to the right hand side of servo-motor piston 25. Again an O-ring 94 is located to seal off the incoming high pressure fluid from the exhaust porting. At this same time fluid from the left hand side of the piston 25 will be exhausted through pipe 21, passage 39, annular recess 53, formed by the left hand liner 45, ports 59, the portion of bore 48 surrounding the reduced spool portion lying between the lands 91 and 92 thence through annular passage 57 and its associated exhaust passage 85 restricted by the conical metering plug formation 84, the manifold passage 37 and exhaust port 36. The radii 60 of extensions 54 and bores 59 provide for smooth passage of O-rings 94, 95 and 96 past bores 59 and the annular passages formed between the liner ends.

To avoid the possibility of an air trap at the left hand end of the spool 29 as the land 91 and its associated O-rings enter liner element 46, the present invention contemplates that the sealing gasket 73 be provided with a radial slot 101 (FIGURE 5) leading outwardly to a point opposite the left hand end of manifold passage 37, as viewed in FIGURE 5, to a drilled vent passage 102 communicating with manifold passage 37. This structure, it will be appreciated, will assure any trapped fluid to the left of spool 29 being vented directly to the manifold passage 37 and exhaust port 36 so that no effective fluid locking of the spool can take place during movement of the spool. In reversal of the spindle movement this passage 102 and slot 101 will permit reverse flow of fluid from the manifold passage to the left hand end of the spool to prevent a vacuum lock upon reversal of the spool movement. Effective movement of the spool 29 between these various positions is accomplished through one or another of the lever operators carried by bracket 67 and now to be described.

Referring first to FIGURE 1, the arm 68 of bracket 67 is drilled radially inwardly from the top of arm 68 toward the spool bore to form a drilled opening 105 intersecting the spool bore. Opening 105 is restricted at its innermost end to captively receive a ball detent 106 a portion of which protrudes into the spool bore to cooperate with one or another of the ball detent grooves 107, 108 and 109 formed in the reduced end portion of the spool 29. Ball 106 is resiliently biased to its protruding position by a coil spring 111 held in place in bore 105 by a suitable abutment screw 112 inserted into the outer tapped end of drilled opening 105. The arm 68 of bracket 67 outwardly from drilled passage 105 is axially slotted at 113 to receive a shifter lever 114. Lever 114 is journalled on a pivot 115 carried by the bifurcated arms 116 formed at the opposite sides of the slots 113. One arm of the lever 114 depends from pivot 115 and terminates in a bifurcated end 117 received in an axial slot 118 formed in the outer end of the reduced end portion of spool 29. Bifurcated end 117 engages a cross pin 119 carried by the spool 29. In the position shown in FIGURE 1, the valve spool is in its extreme right hand position and ball 106 is engaged with annular groove 107 to retain the spool in this position. Assuming spool 29 is to be moved to the shut-off position, the rod 121 carried by the other arm 122 of lever 114 is moved in a clockwise direction around pivot 115 thereby forcing the spool 29 to the left and camming detent ball 106 back into drilled passage 105 until groove 108 is opposite the ball. When the groove 108 reaches a position opposite ball 106 spring 111 will project the ball into the groove and positively indicate to the operator that the next valve position has been reached. If desired the operator may leave the valve in this position or may merely pass the spool through this position to its next position in which groove 109 cooperates with ball 106. It will be appreciated, therefore, that the operator of FIGURE 1 provides a detent indication for the three valve positions and provides a simple and effective operating mechanism for the valve of FIGURE 1.

The bracket 67 of the present invention is preferably formed to support a lever operating mechanism adapted to automatically maintain the spool valve member 29 in a selected one of its several positions. One form of such automatic operator is illustrated in FIGURES 3 and 4 wherein the bracket arm 68 is axially slotted in parallel relation to the axis of spool 29 as indicated at 125 and provided with oppositely facing cylindrical bosses 126 and 127 having upstanding ears 128 and 129 disposed at opposite sides of slot 125. Bosses 126 and 127 mount an operating lever 131 and associated biasing mechanism. As clearly seen in FIGURE 4, lever 131 is carried on a pivot pin 132 which is in turn supported in an enlarged cross bore 133 intersecting slot 125 by means of a shouldered disc 134 disposed in one of the outer ends of bore 133 with its hexagon shaped head 135 abutting the outer face of boss 126 and the shouldered hexagon head 136 of pin 132 abutting the outer face of boss 127. Axial movement of disc 134 along pin 132 is prevented by a snap ring 137 cooperating with a groove in pin 132 and the outer face of disc 134 in well known manner.

Pin 132 at opposite sides of lever 131 pivotally supports respective levers 138 and 139 the upper ends of which are formed with integral upwardly extending fingers 140 and 141 disposed respectively adjacent the edges 142 and 143 of lever 131. A pin 144 carried by lever 141 respectively engages fingers 140 and 141 depending upon the direction of movement of lever 131 around pin 132 as will be presently pointed out. Respective stop pins 145 and 146 are mounted in the ears 128 and 129 of bracket arm 68 with their axes lying in the vertical plane containing the axis of pin 132 and their inner ends projecting into the slot 125 and terminating short of the side faces of the lever 131. These stop pins abut the respective fingers 139 and 141 to limit movement of the levers 138 and 139 in one direction. Each of the levers 138 and 139 opposite the inner ends of the bores 133 are provided with drilled passages 147 adapted to receive the terminal inner ends of respective coil springs 148 housed in the aligned portions of bore 133 and having their opposite terminal ends disposed in drilled passages 149 and 151 provided respectively in mounting disc 134 and head 136 of pin 132. These springs 148 are respectively tensioned during assembly of the lever mechanism by turning the head 136 of pin 132 and its associated disc 134 in the desired direction until suitable tension is built up in the spring. The tensioned position of head 136 and disc 134 is maintained by inserting lock pins 152 and 153 into apertures provided in the face of bosses 126 and 127 in position to be in the path of the corners of the hex heads of pin 132 and disc 134. Each of the pins 152 and 153 has a force fit in its aperture so as to prevent it from accidental dislodgement.

As clearly seen in FIGURES 3 and 4, the lower end of lever 131 extends downwardly terminating in a bifurcated terminal end 154 received in axial slot 118 of spool 29 with the bifurcations in turn receiving between them a roll pin 155 carried by spindle 29 and extending across slot 118. The upper end of lever 131 is preferably provided with a hand gripping ball 156 of hard rubber or the like to provide a suitable grip for operating the lever 131. While the springs 148 and their tensioned levers 137 and 138 may be tensioned to maintain the spool 29 in any one of its three positions, the present embodiment contemplates that the lever 131 be maintained in position to dispose spool 29 in its intermediate or full shut-off position shown in solid lines in FIGURE 3 and generally designated as the "neutral" position. This neutral position is secured by reason of the tensioned arms 137 and 138 respectively engaging the opposite ends of pin 144 on opposite sides and forcing the pin 144 and lever 131 into vertically centered relation with respect to stop pins 145 and 146 in a manner that will be clear from an inspection of FIGURE 3.

Assuming that operation of the valve to supply fluid through ported boss 142 is desired, lever 131 will be moved counterclockwise around pin 132 to thereby move spool valve 29 to the left as seen in FIGURE 3 to vent boss 43 to the exhaust port 36 and connect boss 42 to the inlet port 35 in the manner previously pointed out. So long as lever 131 is held in this position against the biasing force of lever 139 and its associated spring 148 fluid flow is assured through boss 42. Upon release of the lever 131, lever 139 and its associated spring 148 will drive lever 131 in a clockwise direction until finger 141 of lever 139 engages its stop pin 146. Shifting of the valve to supply fluid through boss 43 is effected by clockwise movement of lever 131 around pivot 132 to move spool 29 to the right as seen in FIGURE 3 to connect inlet port 35 and the port in boss 43 as heretofore described and to vent the port in boss 42 to the exhaust port 36. Upon release of the lever 131, tensioned lever 138 and its spring will drive lever 131 in a counterclockwise direction until finger 140 of lever 138 engages its stop pin 145. In order to limit the clockwise and counterclockwise movement of the arm 131 to assure proper positioning of the valve, lever 131 at points 157 and 158 is notched to respectively engage the upper and lower corners of bracket arm 68 formed by the intersection of the base wall of slot 125 and the top and bottom surfaces of bracket arm 68. It will be appreciated from the description just given that the valve of FIGURES 3 and 4 provides a convenient "neutral" return four way valve in which the valve operating mechanism is readily accessible and may be conveniently replaced and repaired without dismantling any portion of the valve proper.

Referring next to FIGURE 6, there is disclosed a four way one-half inch valve in which the bracket 68 is modified slightly from that shown in FIGURES 3 and 4. In this form of the invention the bracket arm 68 is formed with a slot 161 of a width sufficient to just freely receive lever 131 and a single boss 126a. The wall of arm 68 at the side of slot 161 opposite that containing boss 126a is drilled as indicated by numeral 162 to a diameter to receive the shank of headed and shouldered pivot pin 132a and the boss 126a, while provided with a coaxially aligned bore 133, is not provided with a return spring. In lieu of ears 128 and 129 and stop pins 145 and 146 of the previous embodiment of the invention, the present embodiment provides an upstanding ear 128a having a drilled ball receiving opening 165 the outer end of which is counterbored and threaded to receive a spring abutment screw 166 adapted to retain a ball detent spring 167 and a detent ball 168 therein for engagement with the side face 169 of lever 131. Lever 131 is notched as indicated at 171 at the lateral midpoint of face 169 to provide a detent notch for determining the "neutral" position of the lever and its associated spool valve 29. In this form of the invention, the head 136 of pin 132a is assembled with the lever 131 and spool valve 29 in neutral position and the disc securing pin 152 is driven home so as to lie against a face of head 136 to restrain pin 132a against rotational movement when lever 131 is moved. In this form of the invention, manual force sufficient to overcome the holding effect of the detent ball moves lever 131 in either a clockwise or counterclockwise direction as desired to move the valve to either of its operative positions or its "neutral" position.

Referring now to FIGURE 7, a four way three-eighths inch valve is shown equipped with a bracket member 68 similar to that just described in connection with FIGURE 6. The operating lever 131a in this embodiment is provided with a foot treadle 173 in lieu of the hand controlling knob. The lower arm of lever 131a of this form of the invention is identical to that heretofore described in connection with FIGURE 6 and the foot treadle 173 is integrally formed on the upper arm as will be clear from the drawing. However, the ball detent 171 and its spring is omitted and a return spring 148 is provided and tensioned, as will appear from the different location of the spring pole 164 in FIGURE 7, in a direction to bias the lever 131a and treadle 173 to the outermost position of spool 29 for supplying pressure fluid to the port in boss 42 and venting the port in boss 43 to the exhaust port 36 through the manifold chamber 37 as previously pointed out. The position of spool 29 in FIGURE 7 corresponds to that shown in FIGURE 5 so that upon rocking movement of the treadle 173 in a clockwise direction around pivot pin 132a the spool 29 will be successively moved to the intermediate "neutral" position and then to the other extreme position in which the port in boss 42 is vented through the exhaust port 36 and the port in boss 43 is connected to the fluid inlet 35. Release of the foot treadle in this form of the invention results in counterclockwise movement of the lever 131 around pivot pin 132a to return the spool valve 29 to the position shown in FIGURES 5 and 7. It will thus be clear that the lever mechanisms of this invention, by simple selection and adjustment of the tension of springs 148 and appropriate use or non-use of ball detents can either be set to bias the valve to any one of the three normal operating positions or to serve as a full manual valve.

Referring next to the operating mechanism disclosed in FIGURES 8 and 9 of the drawings, there is illustrated a one-half inch four way valve provided with a bracket member 67 in all respects identical to that just referred to in connection with FIGURE 7, including the tensioning of spring 148 to normally bias the spool 29 to its extreme right hand position. In this form of operating mechanism, the lower arm of the shaft 131b again is provided with bifurcated end portion 154 but the upper end is provided with a right angularly extending arm 175 which is itself bifurcated at its outer end to provide laterally spaced arms 176 and 177. These arms are suitably apertured to receive the opposite ends of a roll pin 178 provided to journal a cam roller element 179 thereon. This particular operating mechanism through the cam roller element 179 is adapted for machine operation rather than foot operation as previously pointed out in connection with FIGURE 7.

Referring next to FIGURE 10, a four way one-half inch valve equipped with a bracket member 67 identical to that described in connection with FIGURE 7 is again illustrated. In this form of the invention, the spring 41 is tensioned as previously described in connection with FIGURES 8 and 9 and the operating lever 131c with a lower bifurcated end 154 as heretofore described is provided with a right angularly disposed arm 181 terminating at its outer end in a toe pad 182 for effecting its operation. In all other respects, the operating mechanism of this embodiment is identical to that heretofore described in connection with FIGURES 8 and 9.

Turning now to FIGURES 11 and 12, there is disclosed a one-half inch three way valve made from a body 27b in the manner heretofore described. In this form of the invention, it will be noted that a single intermediate liner member 45 is used with end liners 46 and 47, that a spool 29a embodies the single reduced diameter portion extending from the inner ring groove adjacent valving land 93 to the inner ring groove adjacent the second valving land 185 at the inner end of the spool. This land 185 at the side nearest the inner end of spool 29a is provided with an end seal ring 96 similar to that heretofore described and a similar ring 96 is provided at the outer end of land 93. The remaining spool rings 94 are of the high pressure type heretofore referred to. The liners 45, 46 and 47 and the spool valve 29a of this form of the invention function substantially like those of the four way valves heretofore described. However, the end cover plate assembly 71a of this form of the invention is provided with a breather opening 186 containing a suitable packing 187 for venting the inner end of the spool 29a since there is no manifold passage and vent passage in these three way valves. This breather opening and packing, it will be appreciated, is drilled in the standard cover plate 71 at the time the cover plates are applied to use on the three way valve structures. It, accordingly, will be seen that the same cover plate suffices for all valves.

As clearly appears from FIGURE 11 the three way valves are admirably suited for operation with the identical operating mechanisms heretofore described in connection with the four way valves since these three way valves have three spool operating positions also. The extreme right hand position shown in FIGURES 11 and 12 supplies fluid from inlet opening 35 to right hand outlet port 41 while outlet 39 is completely shut-off through land 185 and its associated rings 94 and 96. In this position, the high pressure fluid supplied by inlet 35 enters between seal rings 94.

The "neutral" position of this valve spool 29a is that in which the two spaced sealing rings 94 engage the opposite end portions of the liner element 45. In this position lands 93 and 185 together with their associated rings 94 and 96 respectively close off both outlet ports 39 and 41 while the high pressure fluid entering from inlet port 35 is again confined between the two spaced seal rings 94.

The third position of the spool valve 29a of the three way valves of this invention is the extreme left hand position. In this position the land 185 and its associated sealing rings 94 and 96 are disposed wholly within the valve liner 46 and the valve land 93 is disposed with its sealing ring 94 in the right end of liner 45 and its support ring 96 in the inner end of liner 47. In this position, high pressure fluid from inlet 35 is again confined to the annular space defined by the reduced section of spool 29a between rings 94. The operator, as disclosed in FIGURE 11, has its spring 148 wound so as to bias the spool valve 29a to its extreme right hand position, namely, the position shown in FIGURE 12. It, however, will be clear from the preceding description that power biasing of this valve could be effected to normally bias the spool valve to either one of the other positions if desired.

Referring to FIGURE 13 a two-way valve made in accordance with this invention is illustrated in section. Except for the shortening of the valve body 27c to eliminate the outlet port 39 this valve is substantially identical to the three way valve just discussed. In this connection it will be noted that a valve spool 29b having a single valving land 93 between sealing ring 94 and support ring 96 is provided for the two-way valves. This spool valve 29b has a reduced portion extending away from sealing ring 94 to the terminal end ring structure 188 containing an end support and seal ring 96 similar to that heretofore described. It will also be noted that these two way valves employ a single intermediate liner member 45 one end of which abuts the cover plate 71a and the other end of which cooperates with the adjacent end of an end liner element 47 similar to that shown in FIGURE 12. This valve in operation has two positions. The first position, shown in FIGURE 13, connects the inlet 35 with the outlet port 38 with the inner sealing rings 94 and 96 effectively engaging the liners 47 and 45 respectively to seal off the fluid from the ends of liner bore 48. In the other position, namely, the left hand position, the ring 94 will sealingly engage the right hand end of the liner element 45 and it together with the outer sealing ring 96 will seal off the inlet 35. At the same time land 93 will overlie the annular passage formed between the ends of liners 45 and 47 with the ring 94 and outer ring 96 sealing the outlet 38 against retrograde flow of fluid therethrough. Any one of the valve operating mechanisms heretofore described in connection with the three and four way valves may be provided on the operating bracket 67 as will be apparent to those skilled in the art.

In all forms of the valves drilled openings 199 extending at right angles to the support faces of feet 31 and clear through the valve body are provided for the mounting screws.

While a one piece spindle of the type heretofore illustrated may be effectively employed in any of the valves of this invention, greater assurance against a blowout of seal rings 94 in high pressure usage where the pressure differential is unduly high on the ring between the inlet and exhaust porting is provided by the novel multi-part spool 29c of FIGURE 13a. As disclosed in FIGURE 13a, spool 29c is made up of an end section 201, an intermediate section 202 and a second end section 203. End section 201 provides land 93, the ring groove for outer seal ring 96 and the protruding end slotted at 118. The end of land 93 adjacent high pressure seal ring 94 is recessed to provide an annular, axially curved ring retainer lip 204. This same end of land 93 is also provided with a coaxially disposed reduced portion or anchor pin 205 of a diameter to provide the annular base of the ring groove and a still smaller reduced terminal mounting stem 206.

Intermediate section 203 is symmetrically formed at opposite sides of land 92 to provide oppositely directed reduced sections terminating at their free ends in respective annularly enlarged flange formations 207. The exposed faces of flanges 207 are recessed similarly to the end of land 93 just described to form annular, axially curved ring retainer lips 204 facing in opposite directions. The opposite ends of section 203 in coaxial relation to flange lips 204 are provided with axial bores 208 slightly exceeding in length the axial dimension of stem 206 and having a diameter adapted to snugly receive stem 206 so as to form a light press fit.

The section 203 contains land 91 and its related ring groove for receiving O-ring 96 adjacent its free end. The opposite end of land 91 is recessed in a manner identical to the inner end of land 93 to provide an annular, axially curved ring retainer lip and is provided with a reduced portion 205 and a mounting stem 206 identical to that formed on section 201.

In assembling the multi-part spool 29c, the 80 Durometer hardness rings 95 are first assembled on opposite sides of land 92 in the usual way. Then the 90 Durometer hardness rings 94 are positioned on reduced portions 205 of sections 201 and 203 and the stems 206 of these sections are then aligned with the bores 208 of section 202 and pressed home therein until the radial shoulders of reduced portions 205 abut the opposed end faces of the recessed end of section 202. The result is that rings 94 are gripped between the opposed recessed ends of sections 201 and 202 on the one hand and 202 and 203 on the other hand with their outer peripheral surfaces being partially overlapped by the respective opposed retainer lips 204. The remaining rings 96 are then assembled in the conventional manner by forcing them over the peripheral surfaces of the free ends of sections 201 and 203.

Assuming the spool 29c to be in place in a four way valve body as heretofore pointed out and that an excessive pressure tending to force one or the other rings 94 into the exhaust passage as it passes over the annular opening between liner 45 and either liner 46 or 47, the high pressure fluid will have forced the particular ring tightly against the recessed end of its respective land 91 or 93 and entered under the ring 94. This high pressure fluid will then have to act radially to force the ring radially through the restricted opening between opposed lips 204. Such radial movement of the ring 94 along the axially curved surface of its respective land will bodily shift the ring axially toward the opposed recessed face of section 203 causing it to assume a position spanning the restricted opening. At the same time that full sealing of the restricted opening occurs the volume of the space radially inwardly of ring 94 will have increased and the effective blowout pressure will have been reduced below its blowout value. The ring 94 by this time will have passed over the annular exhaust passage to vent the high pressure to exhaust and become confined by the encircling liner wall. The conditions essential for blowing of ring 94 will, therefore, have subsided with the result that blowing is effectively prevented as a practical matter.

Since end section 201 in all forms of the valves heretofore described are identical, it will be appreciated that the valve spools 29a and 29b may also be provided with this blowout prevention feature by similar construction of the related intermediate and inner end sections of the three way valve spool and formation of the outer end of the end section of the two way valve in the manner just described with respect to section 202 of the four way valve spool.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A multi-part valve spool comprising an end section having one end adapted for connection to an operator for axially reciprocating said spool, an annular ring groove formation spaced axially inwardly from said one end and formed by an axially extending ring receiving reduced portion and an integrally formed radial shoulder the end face of which at its outer marginal portion is curved axially to form an annular lip overhanging said reduced portion and an axially extending mounting stem of further reduced diameter extending from the free face of said ring receiving reduced portion; a mating section having a peripherally disposed valving land formed thereon between its opposite ends and flanked on at least one side by a ring groove and at least one end providing a radial face the outer marginal portion of which is curved axially to form an annular overhanging lip and the center of which is provided with an axial bore dimensioned to snugly receive said mounting stem in a press fit, said end section and said mating section being connected in assembled relation with said stem in said bore and said ring receiving reduced portion in end abutment with said one radial face of said mating section to dispose said opposed overhanging lips in axially spaced relation defining an annular ring groove; an O-ring disposed in said ring groove in peripherally spaced relation to said respective opposed faces of said sections and with an axially centered peripheral portion disposed in the space lying between said lips to provide a bore sealing portion, said O-ring, when distended by the line pressure while passing over an annular port of a valve bore, being adapted to sealingly engage the curved portions of said opposed lips; and an O-ring seal disposed in said ring groove flanking said valving land.

2. The spool structure in claim 1 wherein said valving land on said mating section is longitudinally centered between the ends of said mating section and is flanked on opposite ends by ring grooves, the other end face of said mating section has its outer marginal portion curved axially to form a second oppositely extending, annular overhanging lip and a centered axial bore; and a further end section having a terminal land formation at one end, an axially extending ring receiving reduced portion, an end face at the inner end of said last mentioned reduced portion and having its outer marginal portion curved axially to form an annular overhanging lip and an axially extending mounting stem of further reduced diameter centered on said opposite end face and dimensioned to snugly fit said bore in the other end face of said mating section, said further end section and said mating section being connected in assembled relation with its stem in said bore of said other end face and said last mentioned ring receiving reduced portion in end abutment with said other end face of said mating section to dispose said last mentioned opposed overhanging lips in axially spaced relation defining an annular ring groove; an O-ring disposed in said last mentioned ring groove with an axially centered peripheral portion extending outwardly between said lips to provide a bore sealing portion; and an O-ring seal disposed in end flanking relation to the inner end of said terminal land formation.

3. A valve spool for use in a valve body having an elongated valve bore intersected at a plurality of axially spaced points by an inlet passage, a pair of axially spaced outlet passages, and a pair of annularly continuous axially spaced exhaust passages comprising an elongated slidable member having longitudinally spaced annular lands; respective O-rings in each of said lands forming slidable and sealing supports between said lands and said bore, each slidable member land being separated by stem portions of reduced diameter forming through the space surrounding the respective adjacent reduced stem portions of the valve member axially extending connection passages for connecting a respective one of said outlet passages and said inlet passage and a respective one of said outlet passages and its exhaust passage; means for shifting said slidable member to establish communication, through said respective axially extending passages, between the other of said outlet passages and said inlet passage and said respective one of said outlet passages and its exhaust passage, said O-rings disposed to pass across said annularly continuous exhaust passages being formed to have an outer diameter 5-8% greater than that of said valve bore and an outer diameter related to the cross-sectional diameter in the ratio of 4 to 1 with customary manufacturing tolerances.

4. A slidable valve member for use in the valve bore of a valve having annularly continuous porting to be passed by ring seals comprising an elongated cylindrical member having enlarged end portions radially dimensioned to annularly clear said valve bore and grooved uniformly in axial length and depth to receive annular O-rings and form actuating piston portions at each end; a plurality of reduced stem portions extending between said piston portions, formed at their respective adjacent ends with enlarged cylindrical formations radially dimensioned the same as said end formations to annularly clear said valve bore and each containing at least one annular groove of predetermined equal width and depth, said stem portions between said enlarged cylindrical formations at their respective opposed ends, cooperating with said valve bore to provide elongated annular spaces adapted in use to form elongated passages for fluid under pressure; and an O-ring of normally circular cross-section in each of said grooves having a cross-sectional diameter approximately 10% smaller than the width and depth of the groove, an outer diameter 5-8% greater than the diameter of said valve bore and an outer diameter to cross-sectional diameter ratio of 4 to 1 whereby said O-rings when assembled will extend beyond the peripheral walls of said enlarged end portions and said enlarged cylindrical formations sufficiently to assure that the O-rings constitute the sole contact with said valve bore and thereby slidingly and sealingly support said valve member in said valve bore.

5. A slidable valve member for use in the valve bore of a spool valve having annularly continuous porting to be passed by ring seals comprising an elongated cylindrical member having enlarged end portions radially dimensioned to annularly clear encircling end portions of said valve bore and annularly grooved to receive O-ring seals, a plurality of reduced stem portions extending between said enlarged cylindrical formations, radially dimensioned to annularly clear encircling intermediate portions of said valve bore and respectively separated by an enlarged annular land having at each end at least one annular groove to receive an annular seal ring, said stem portions providing between said enlarged end portions elongated annular spaces adapted in use to form axially extending flow passages for fluid under pressure, and O-rings of resilient material in each of said grooves having an outer diameter 5-8% greater than the diameter of said valve bore and a cross-sectional diameter related to the outer ring diameter in the ratio of 1 to 4 with customary manufacturing tolerances.

6. A valve spool for use in a slidable spool valve having a body formed with an axial bore and generally radially directed inlet, outlet and annularly continuous exhaust ports intersecting said axial bore at axially spaced points comprising an axially slidable member providing small diameter stem portions and axially spaced, annularly grooved larger diametered valving lands defining the opposite ends of annular port connecting passages encircling said stem portions of said spool member; and O-rings of resilient material disposed in said respective annular land grooves, the said O-rings cooperating with the outlet ports and passing across the annularly continuous exhaust ports and being constructed of a material having a Durometer hardness of at least 90 and having an outer ring diameter 5 to 8% greater than the diameter of said axial bore and a cross-sectional diameter related to the outer ring diameter in the ratio of 1 to 4 with customary manufacturing tolerances.

7. The spool member of claim 6 wherein the spool member is fabricated from a pair of end sections each having a shallow cupped inner end wall and a reduced diameter anchor pin portion protruding from said inner end wall and an intermediate section having oppositely facing shallow cupped end walls each of which surrounds an axial bore dimensioned to form a tight press fit with the reduced diameter anchor pin portion of a respective end section, the respective cupped end walls of said end sections cooperating in the assembled relation of said spool member sections with a respective cupped end wall of said intermediate section to impart to said innermost grooves of the outlet port lands undercut ring gripping groove walls.

8. The spool member of claim 6 further characterized by said spool member outlet port lands at the ends adjacent the respective spool ends being provided with resilient spool supporting O-rings of substantially lower Durometer hardness having a squeeze fit with said axial bore and a cross-sectional diameter to fill their respective grooves and form a firm support for said spindle.

9. The spool member of claim 8 wherein one end of said spool member protrudes beyond its body end face, is bifurcated to provide an operating lever slot and provided with a transverse pin receiving opening and a cross pin adapted to provide an operating lever connection.

10. The spool member of claim 6 wherein said spool member has at least one annularly grooved inlet port valving land disposed between said outlet port valving lands and resilient O-ring means of substantially less than 90 Durometer hardness mounted therein to effectively seal said axial bore between said inlet port and one or the other of said outlet port lands in operation of said valve.

References Cited in the file of this patent

UNITED STATES PATENTS

| | | |
|---|---|---|
| 2,417,494 | Hoof | Mar. 18, 1947 |
| 2,600,746 | Ernst | June 17, 1952 |
| 2,605,079 | Miller et al. | July 29, 1952 |
| 2,621,676 | Loft | Dec. 16, 1952 |
| 2,621,885 | Schmitt | Dec. 16, 1952 |
| 2,690,360 | Young | Sept. 28, 1954 |
| 2,704,650 | Rand | Mar. 22, 1955 |
| 2,808,811 | McLaughlin | Oct. 8, 1957 |

FOREIGN PATENTS

| | | |
|---|---|---|
| 472,593 | France | Dec. 10, 1914 |
| 702,088 | Great Britain | Jan. 6, 1954 |

OTHER REFERENCES

Handbook of O Ring and Dynaseal Packings Precision Rubber Products Corporation, p. 15, copyright 1953.